W. B. PROUTY.
VEHICLE BODY BRACE.
APPLICATION FILED APR. 21, 1919.
1,365,341.
Patented Jan. 11, 1921.
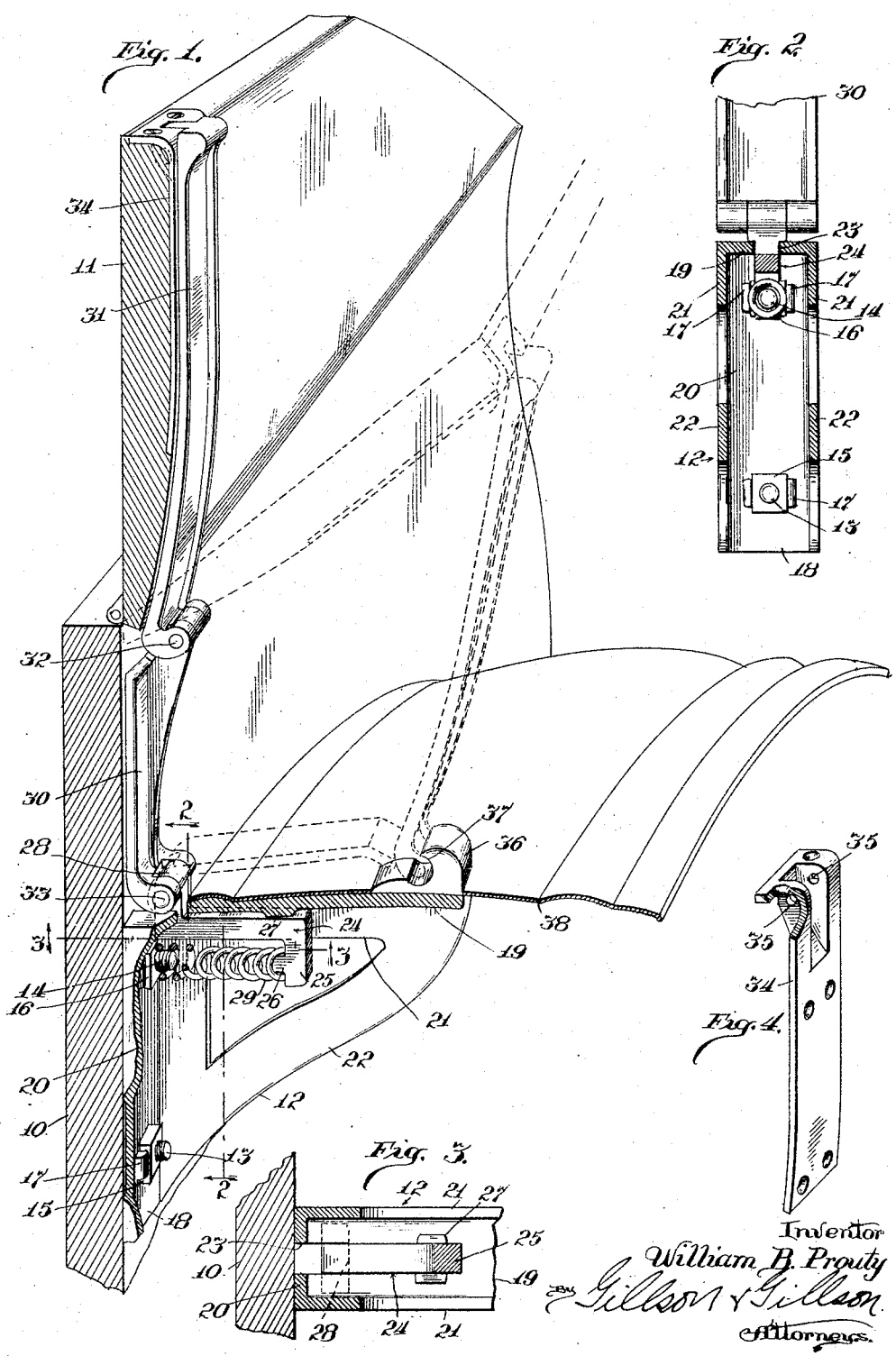

UNITED STATES PATENT OFFICE.

WILLIAM B. PROUTY, OF EVANSTON, ILLINOIS, ASSIGNOR TO PRESTO-PASSENGER TRUCK CO., OF CHICAGO, ILLINOIS, A CORPORATION OF DELAWARE.

VEHICLE-BODY BRACE.

1,365,341.            Specification of Letters Patent.     Patented Jan. 11, 1921.

Application filed April 21, 1919. Serial No. 291,477.

*To all whom it may concern:*

Be it known that I, WILLIAM B. PROUTY, a citizen of the United States, and resident of Evanston, county of Cook and State of Illinois, have invented certain new and useful Improvements in Vehicle-Body Braces, of which the following is a specification, and which are illustrated in the accompanying drawings, forming a part thereof.

The invention relates to braces for vehicle bodies and the object of the invention is the provision of a brace for a swinging panel which shall be strong and not liable to rattle, and generally be more efficient than devices of like character now in use.

In the accompanying drawings;

Figure 1 is a perspective view, partly in section, of the brace in place, the dotted lines showing a different position of the parts;

Fig. 2 is a detail section taken on line 2—2 of Fig. 1;

Fig. 3 is a detail section taken on the line 3—3 of Fig. 1; and

Fig. 4 is a perspective view of a part, a portion of which is broken away to more clearly show its structure.

The vehicle body brace, which forms the subject of my invention, is designed to be attached to a stationary panel of a vehicle and to support an extension panel when in its lowered position. In the embodiment shown, the stationary panel is disclosed at 10 and the hinged extension panel at 11. There is disclosed a bracket 12 secured to the fixed panel 10, as by bolts 13, 14, having nuts 15, 16, thereon. I have indicated lugs at 17 to prevent the nuts from turning when the bolts are tightened. The bracket is preferably made hollow, the base 18 and the top 19 being in the form of channels having flanges 20, 21, and brace members 22, joining the ends of the flanges. The top of the bracket is provided with a slot indicated at 23. A sliding bolt 24 having a depending portion 25 with a spring seat 26, thereon, is guided in lugs 27 for sliding movement. Said bolt 24 has a portion 28 projecting through the slot and a head on said portion provided with an eye therethrough. A spring 29 is seated at one end upon spring seat 26 and the other end is seated over bolt 14 and upon nut 16. This spring holds sliding bolt 24 in its retracted position, as shown in Fig. 1, with portion 28 pressed against the end of the slot. There is shown a pair of links 30, 31, pivotally connected together, as by means of a pin 32, link 30 being pivoted to the eye of the portion 28, as by a pin 33. Link 31 is pivoted to a plate 34 shown in perspective in Fig. 4 by a pin passed through an aperture in an offset on the end of the link and through apertures 35 in the plate. Plate 34 is preferably set into the swinging panel 11 flush with the surface thereof. Links 30 and 31 are preferably made of such a form as to conform closely to the outline of the outside of the vehicle when the parts are in the position shown in Fig. 1. When it is desired to lower the hinged panel to the dotted line position shown in Fig. 1, it is only necessary to disconnect whatever means there may be in use to lock the movable panel upright and pull outwardly on the upper edge of the same. It will be noted that the portion of the links which are joined by pin 32 are at the extremities of outwardly projecting portions so designed that pivot 32 lies an appreciable distance outside of a line joining pin 33 and apertures 35. Therefore pressure tending to move the extension panel outward and downwardly will automatically move the joint between the links, at 32, outwardly, when link 30 will swing about the pivot 33 as an axis and the link 31 will assume its bracing and supporting position with reference to the swinging panel shown in dotted lines in Fig. 1. To hold the parts firmly in the position shown in dotted lines in Fig. 1 there is provided a seat 36 for the movable pivot 32 at the end of bracket 12. This seat is rounded to conform to the outline of the joint between the links and has a rounded top, as 37, the distance of the seat from the pivot 33 being such that the rounded joint between the links will impinge upon surface 37 and force sliding bolt 24 toward the vehicle body against the pressure of spring 29. When the rounded joint has passed below the point of the seat 36 the joint will be forced home into the seat by means of spring 29, which will not, in this position, force the bolt 24 to entirely return to its normal position, with portion 28 against the end of slot 23. Therefore, when the hinged panel is in its lowered position there will always be spring pressure tending to hold the joint between the links firmly in the seat 36 and rattling will tend to be prevented.

As shown the bracket is placed under the fender 38 and serves as support therefor as well as being almost entirely concealed thereby, only the portion 28 of the sliding bolt and seat 36 projecting above the panel.

It will be obvious that I have provided an efficient brace of this type and one which should not be objectionable because of rattling when in use.

I claim as my invention:

1. In combination, a vehicle body comprising a fixed panel and a movable panel, a brace pivotally attached to said movable panel, a swinging pivot for said brace movable away from the vehicle body when the movable panel is lowered, a support for said swinging pivot spaced away from said fixed panel, and means for resiliently pressing said pivot and support together.

2. In combination, a vehicle body comprising a fixed panel, and a movable panel, a brace pivotally attached to said movable panel, a swinging pivot for said brace movable away from the vehicle body when the movable panel is lowered, a support for said swinging pivot spaced away from said fixed panel, and means for resiliently pressing said pivot against said support.

3. In combination, a vehicle body having a fixed panel, a movable panel hinged thereto, a bracket secured to said fixed panel, a pair of links pivotally jointed together, one end of one link pivotally attached at a point adjacent the vehicle body and bracket and one end of the other link pivotally attached to the movable panel, a seat upon said bracket for the joint between said links, and means for resiliently pressing said joint against said seat.

4. In combination, a vehicle body comprising a fixed panel, a movable panel hinged thereto for outward movement and a fender, a pair of links pivotally connected to each other and to said fixed and movable panels, a bracket attached to said fixed panel and serving as a support for said fender, and a seat on said bracket for the joint between said links, said seat projecting above said fender.

5. A brace for a vehicle body comprising a bracket adapted to be secured to the vehicle body, a pair of links pivotally attached together, one of said links pivotally attached to said bracket, the other link adapted to be pivotally attached to a movable part of the vehicle body, a seat on said bracket for the joint of said links, and means for resiliently pressing said joint against said seat.

6. A brace for a vehicle body comprising a bracket adapted to be attached to a fixed part of said body, a member slidably supported by said bracket adjacent the plane of attachment to said vehicle body and spring pressed away from said plane, means to limit the travel of said member, a pair of links pivotally joined together, one of said links pivotally connected to said sliding member the other link adapted to be pivotally connected to a movable part of said vehicle body, and a seat on said bracket for the joint between said links.

7. A brace for a vehicle body comprising a bracket, a member slidably supported by said bracket adjacent its base and spring pressed away from said base, means to limit the travel of said member away from said base, a pair of links pivotally joined together, one of said links pivotally joined to said sliding member, a seat on said bracket adjacent its point for the link joint, the shape and proportion of parts being such that entry of the joint into the seat will result in movement of the sliding member against its spring pressure and the joint will be spring pressed against the seat.

8. A brace for a vehicle body comprising a bracket having channeled base and top members and separated side brace members joined to the flanges of said channels, said top member having a slot adjacent said base, a sliding brace pivot lying within said channeled top having an eye projecting through said slot and a spring seat at its opposite end, a spring interposed between said seat and said bracket base holding said brace pivot against the limit of the slot, a pair of links pivotally joined together, the joint having a protruding rounded formation, one of said links pivotally connected to said eye, and a rounded seat for said link joint firmly secured to the bracket at a distance from the normal position of said eye slightly less than the length of said connected link.

WILLIAM B. PROUTY.